United States Patent Office 3,488,255
Patented Jan. 6, 1970

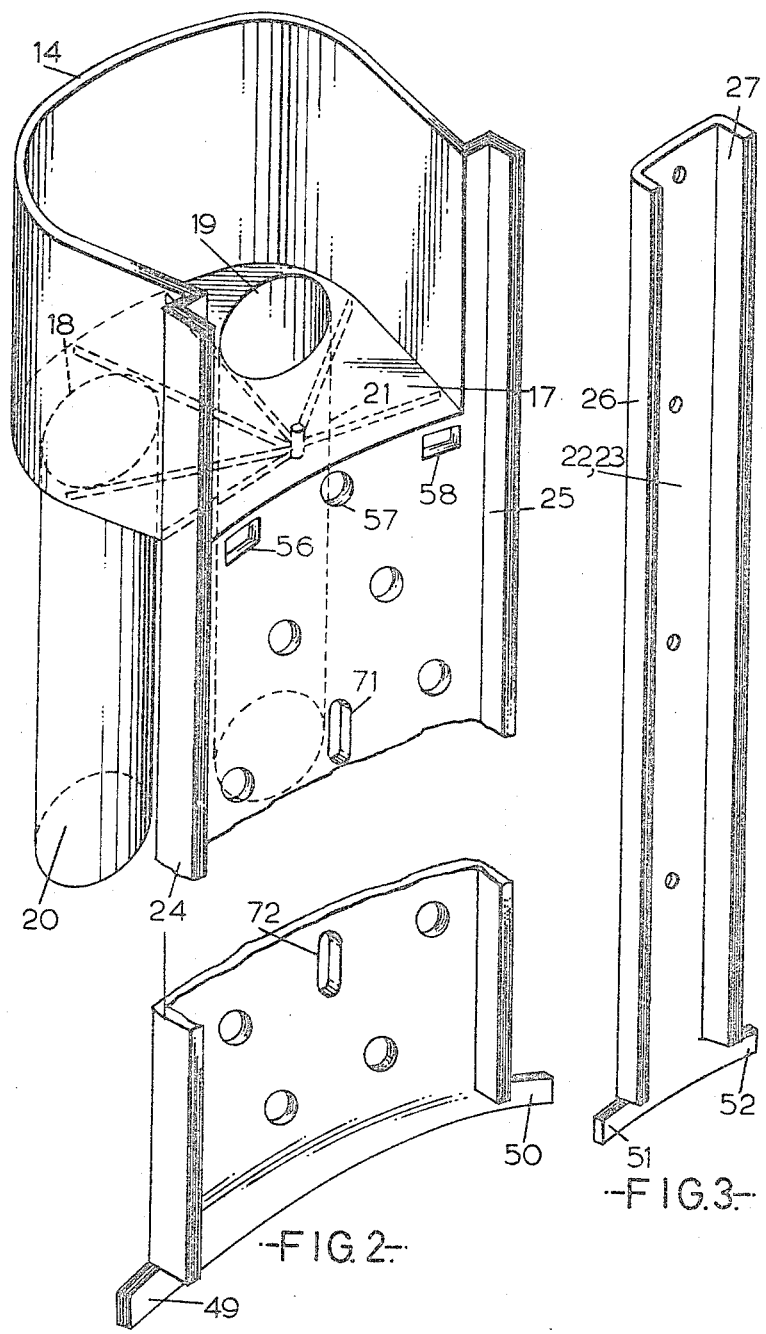

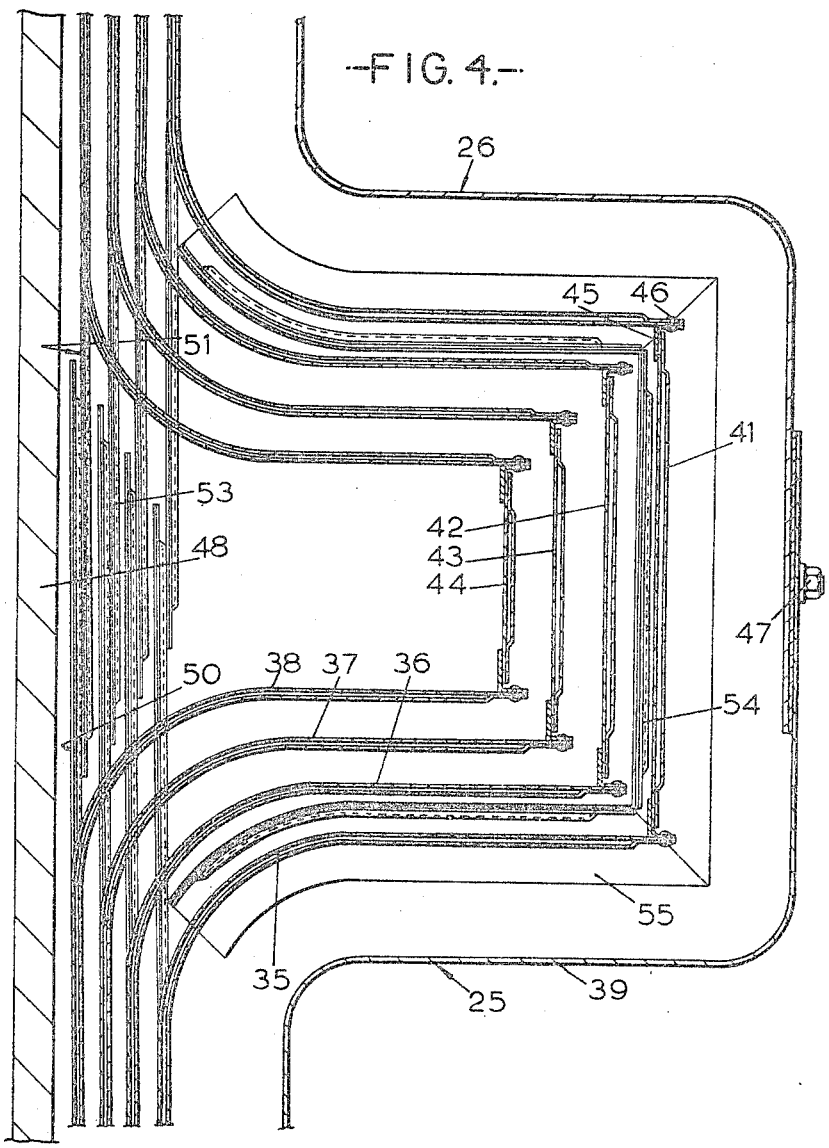

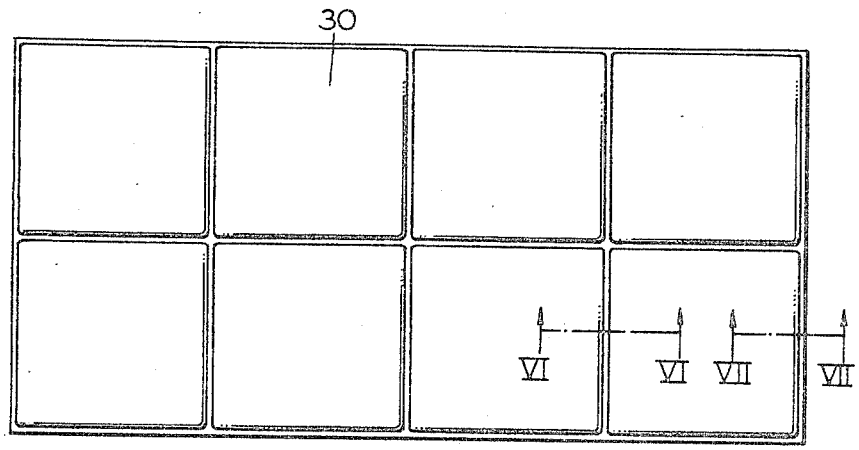
-FIG. 5.-
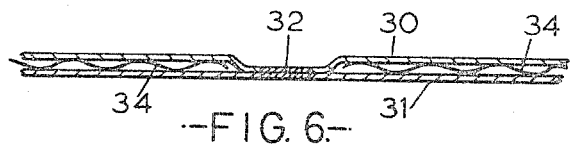
-FIG. 6.-
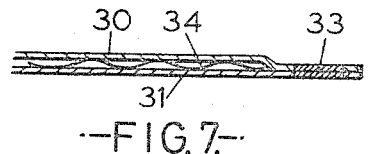
-FIG. 7.-

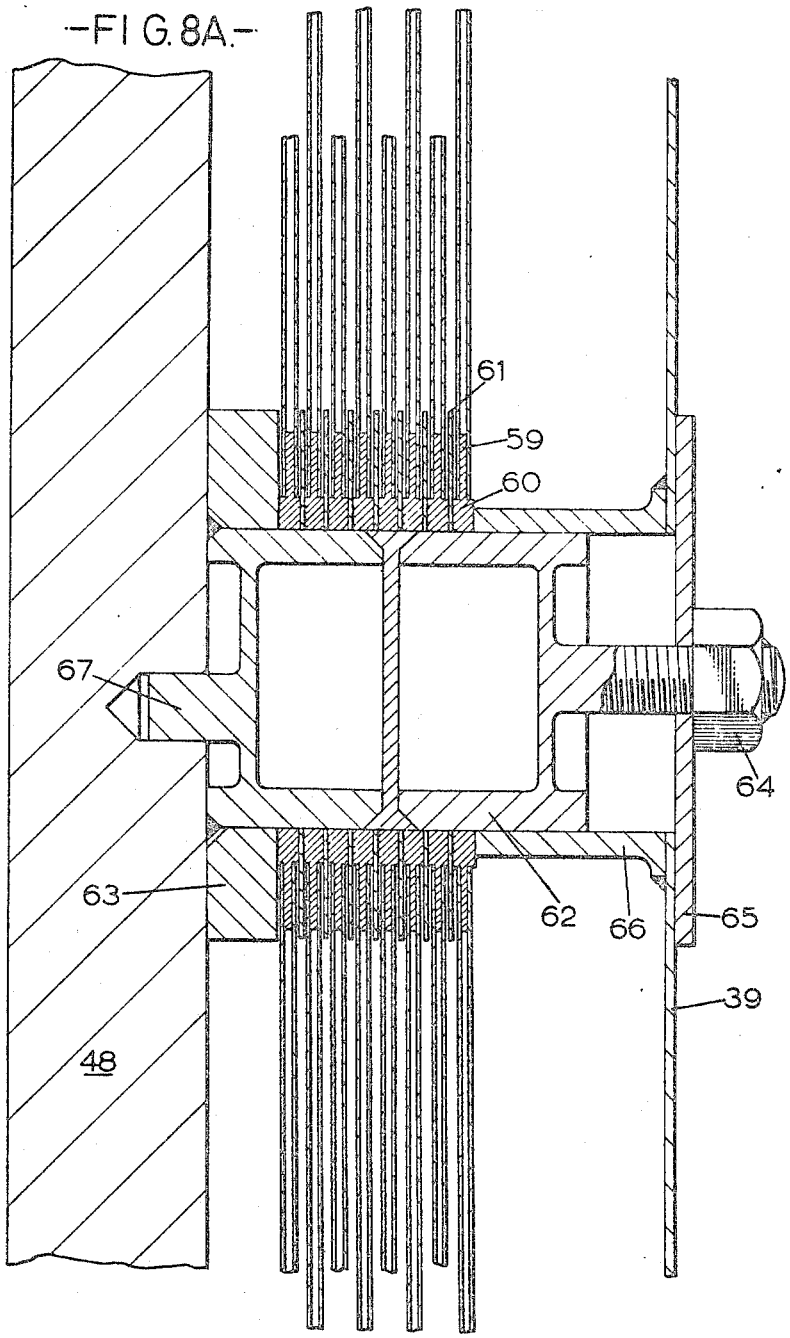

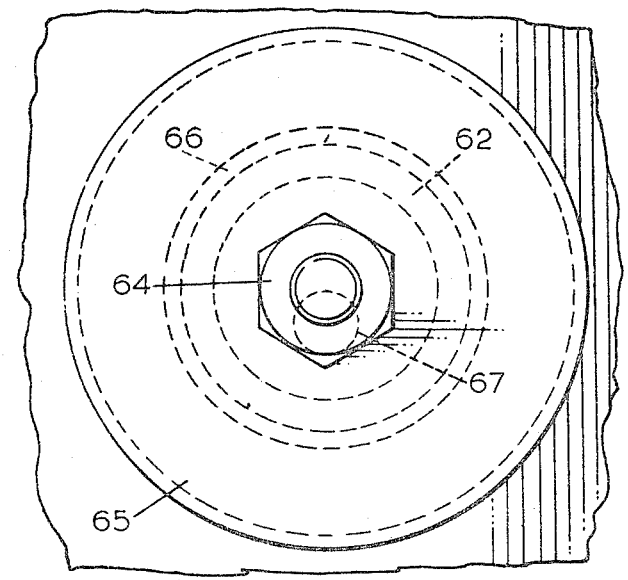
-FIG.8B-
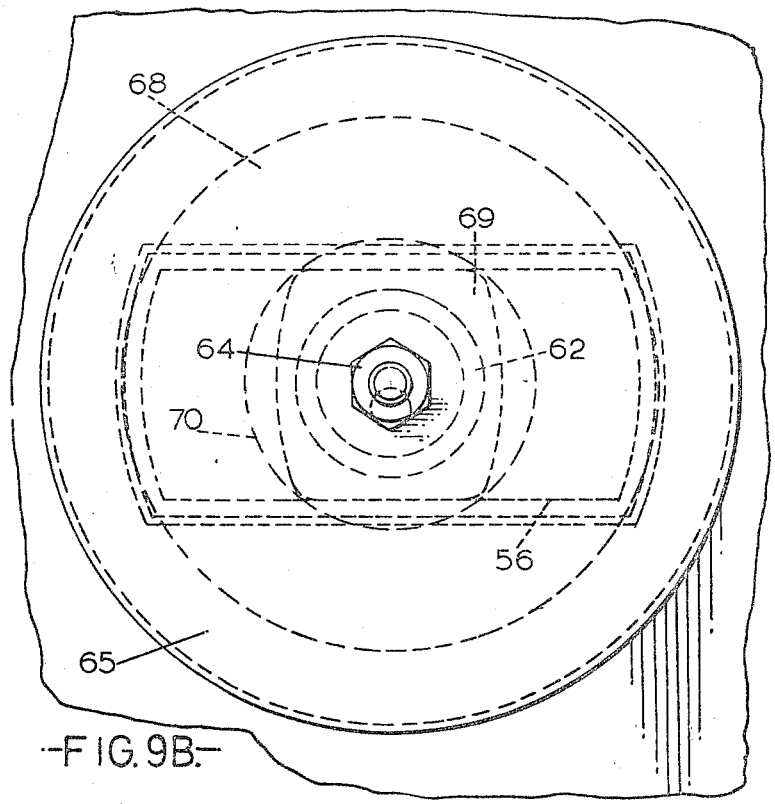
-FIG.9B-

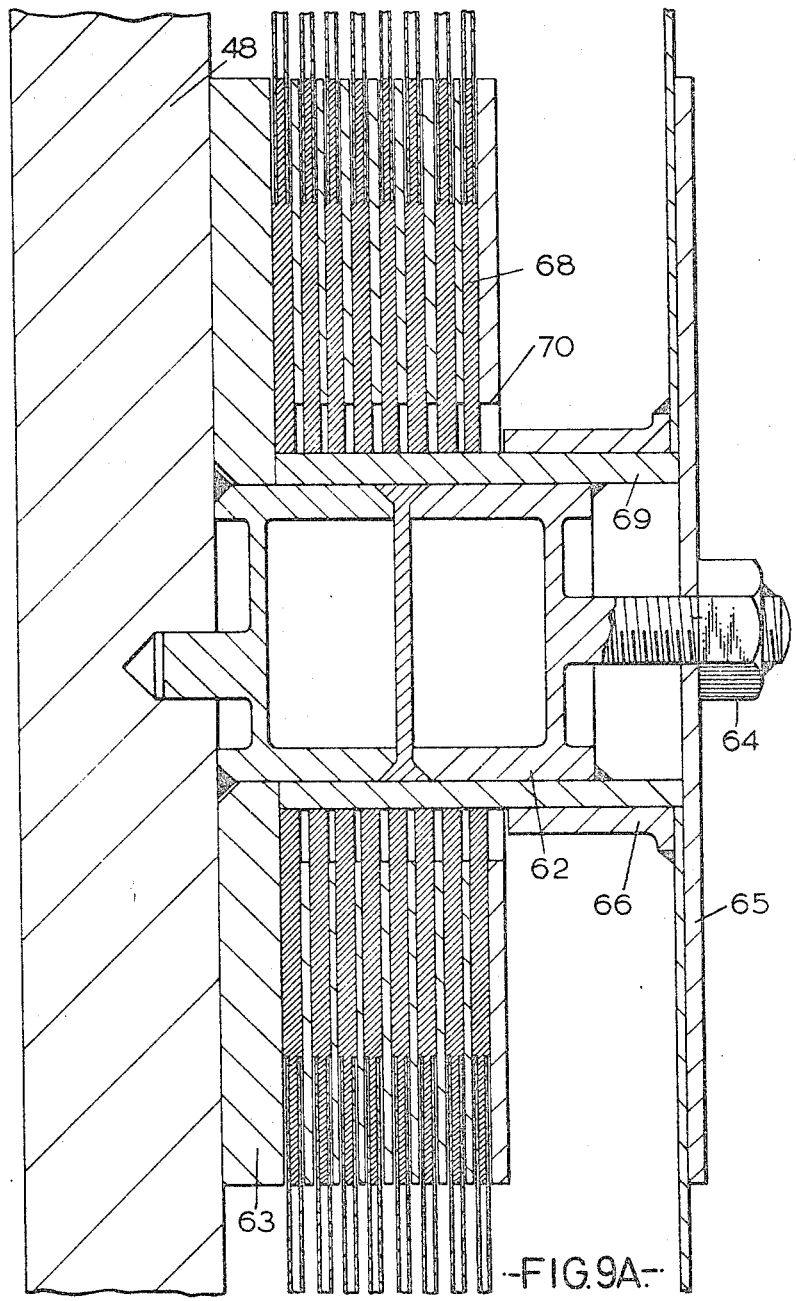

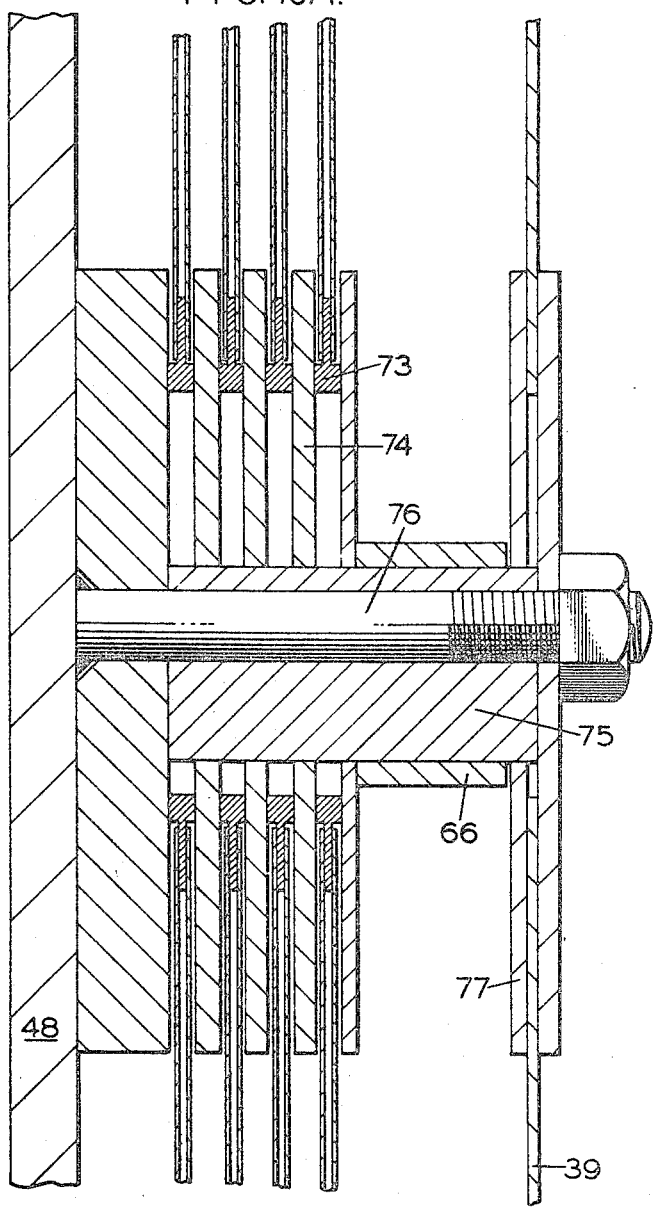

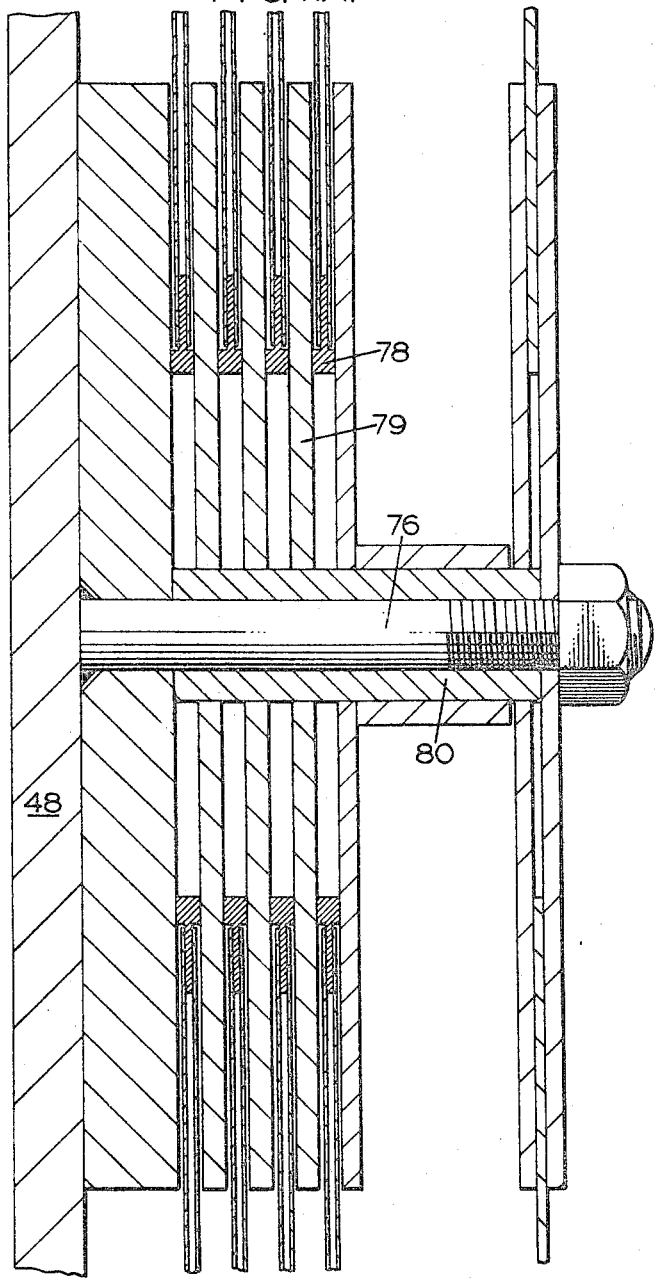

3,488,255
THERMAL INSULATION STRUCTURES AND FAST REACTOR HAVING SUCH INSULATION
Owen Hayden, Harwood, near Bolton, Derek Taylor, Knutsford, and Derek Edmund Tisdall, Heighington, England, assignors to United Kingdom Atomic Energy Authority, London, England
Filed Nov. 24, 1967, Ser. No. 685,475
Claims priority, application Great Britain, Dec. 9, 1966, 5,539/66
Int. Cl. G21c 11/08
U.S. Cl. 176—40                                   15 Claims

ABSTRACT OF THE DISCLOSURE

A thermal insulation structure for direct contact with liquids is built up from several layers of panels, each panel comprising a pair of substantially parallel metal sheets joined directly to each other by welding along lines or ribs which describe a multiplicity of closed shapes within the outlines of the sheets, so as to form a multiplicity of gas-containing compartments which are sealed from one another. The layers are spaced apart to allow liquid to infiltrate between them, circulation of liquid being discouraged, and the compartment defining welds of a layer are staggered relative to an adjacent layer. Constructions applicable to the thermal insulation of a jacket for the core of a sodium-cooled fast nuclear reactor are described.

---

The present invention relates to thermal insulation structures for direct contact with liquids and utilising a type of insulation, disclosed and claimed in United States patent application Ser. No. 448,649, now Patent No. 3,421,977, granted Jan. 14, 1969, which comprises a pair of substantially parallel metal sheets joined directly to each other by welds which are continuous along lines describing a multiplicity of closed shapes within the outline of the sheets. By means of these joints there is defined between the sheets a multiplicity of gas-containing compartments or pockets which are each individually fully sealed from one another.

According to the present invention, a thermal insulation structure is composed of several layers of the type of insulation referred to above and these layers are spaced apart, preferably without any substantial direct contact between adjacent layers, in a manner allowing liquid to which the structure is exposed to infiltrate between the layers; furthermore, compartment-defining welds of a layer are staggered relative to an adjacent layer. Although liquid between the layers will act as a thermally conductive bridge from one layer to the next, its thermal capacity acts to damp the rate of transmission of rapid temperature changes through the insulation structure so that materials on the side of the structure remote from the temperature change are protected from thermal shock. The staggering of the compartment-defining welds of adjacent layers serves to lengthen the thermally conductive path through the structure and provided by the liquid between layers and the said welds. As a further protection against thermal shock, the insulation structure may have a facing in the form of a single thickness metal sheet, also spaced from the adjacent insulation and preferably with a spacing larger than that between the layers. This facing also serves as a protection against damage during erection.

In order to maintain the spaced relationship it is possible to provide projections on the insulation layers so that the layers interengage through these projections. Such projections could be either attached to the respective layer or formed integrally as by the pressing out of a dimple or like protuberance or by the turning in of a sheet edge. The extent of interengagement entailed by this manner of spacing can be kept small enough not to detract significantly from the protective efficiency of the insulation structure. However, if there is a possibility of relative movements of the layers in service, for example due to differential thermal expansion, it may be undesirable to have interengagement on account of the possibility of seizure or wear by fretting at the sheet surfaces. Therefore, it is generally preferred that the spacing is maintained by unattached distance pieces which are interleaved between the layers and retained in position by the support means of the structure. It may also be desirable to use hard metal faces at the regions of contact, for example Stellite coatings.

Another feature of the invention is that edges on the insulation layers are formed by inserts only partially interposed between the two sheets of a layer and secured thereto so as to leave a margin of the insert uncovered; this margin may be thicker than the interposed portion. The increased thickness may be such that the margin faces stand proud of the sheets so that if distance pieces for spacing purposes are used at these faces the sheets themselves are relieved of all contact.

The foregoing feature based on the use of inserts lends itself to the joining together of insulation panels required to form one layer. In this case part of the insert is interposed between the sheets of one panel and an adjacent part between the sheets of the next panel. No part of the insert may remain uncovered and thickening of the insert would not then arise. With a joint of this sort, the sheet edges may of course be staggered although preferably the staggering is the opposite way round on the respective panels so that the sheet edges of the panels can meet. Corners or other changes of direction can be introduced into the layers by bending of the insert intermediate the panels joined thereby.

Another form of panel joint is one in which the panel edges, formed simply by a welding together of the respective pairs of sheets, are fixed to a common backing strip which, as with the insert joint, may be bent for making a change of direction. Yet other forms of joint may utilise direct fixing together of the sheets themselves, for example, panel edges formed by a welding together of the two sheets of the panel may have a sufficient thickness for butt welding of the edges. Alternatively, one sheet of a panel may project beyond the other and so afford a strip of single thickness sheet available for fixing as by welding to the adjacent panel or a similar strip thereof. With strips on both panels, the strips can be bent into a confronting relationship with their edges coinciding thereby enabling an edge weld to be run along the edges for fixing them together. Whatever form of joint is employed, it is generally desirable that the joint substantially precludes the passages of liquid from one side to the other of an insulation layer over the whole length of the adjoining panels. As a further aid towards suppression of liquid circulation in the insulation structure, small strips of metal may be fitted in spaced relationship between the layers to act as spoiler vanes.

The introduction of changes in direction into the layer is relevant not only for the tailoring of the structure for the lining of complex shapes but also for a further feature of the invention aimed to accommodate dimensional changes in the layers due to thermal expansion. According to this feature the insulation structure has a double bend like a joggle extending transversely of a direction in which thermal expansion is to be accommodated. In a structure of generally cylindrical shape in which some absorption of radical dilation and contraction is desirable the joggle would extend lengthwise of the structure.

For further description of the invention reference will be made to the accompanying drawings in which are shown, merely by way of example, various parts of a structure made in accordance with the invention for lining the interior of a reactor jacket by which the core of a sodium cooled fast nuclear reactor is separated from a reservoir of the coolant in which the jacket and core are submerged. In the drawings:

FIGURE 2 is a schematic isometric view of one section of the jacket lining,

FIGURE 3 is a similar view of another section of the lining,

FIGURE 4 is a detail in plan view showing the interconnection employed between the lining sections of FIGURES 2 and 3, FIGURE 5 is an elevation of an insulation panel, FIGURES 6 and 7 are sections to a larger scale respectively on the lines VI—VI and VII—VII of FIGURE 5, FIGURES 8A and 8B are respectively a cross section and elevation of a lining support stud, and FIGURES 9A and B, 10A and B and 11A and B are similarly cross sections and elevations of other forms of stud.

Figure 1:
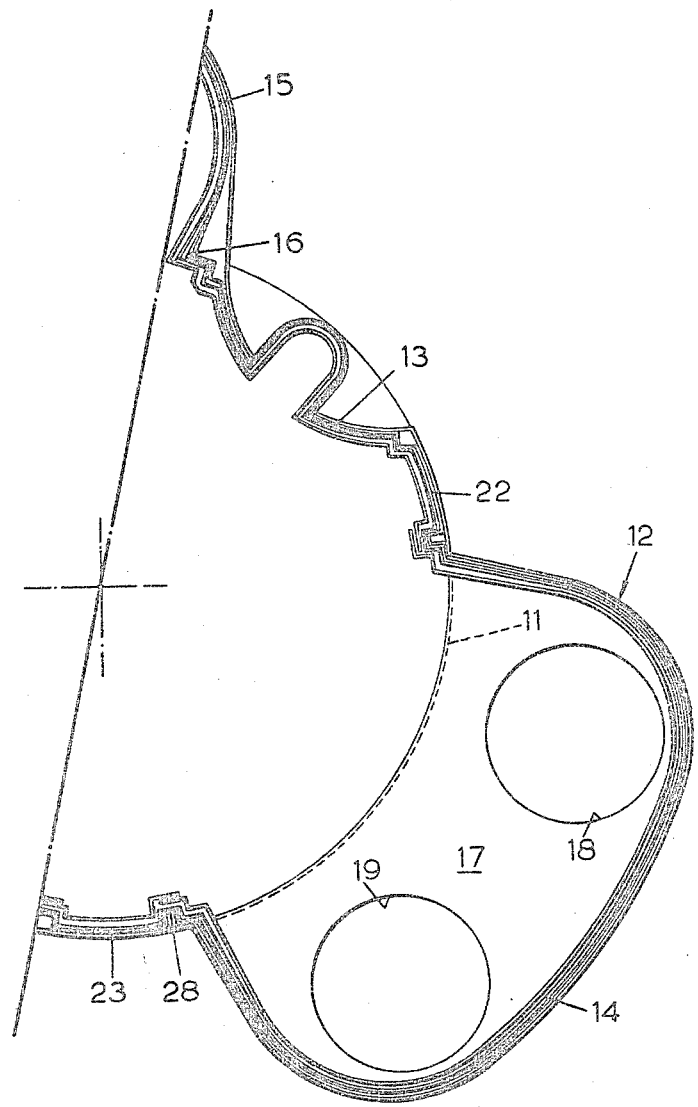
FIGURE 1 is a part plan view of the assembled jacket lining.

As seen in FIGURE 1, the shape of the assembled lining indicates that the reactor jacket has a lower portion 11 and an upper portion 12, both being cylindrical except for an inward bulge at 13 on the lower portion and the more major addition on the upper portion of three lobe-shaped trays such as 14 and 15. All three trays are of exactly the same shape as the one denoted 14 except for a slightly different corner at 16 to match the bulge 13 in the case of the tray 15. A floor 17 of each tray has two circular openings 18 and 19. The arrangement of the reactor is that the core with surrounding neutron shielding is disposed in the lower portion 11 and that sodium coolant passed upwardly through the core is allowed to flow into the trays in the upper portion and thence into primary heat exchangers which are suspended through the tray openings. From the lower ends of these heat exchangers the coolant is discharged into the coolant reservoir in which the jacket and core are submerged.

The insulation lining structure is required to line all of the inner surfaces of the reactor jacket. Its function in this role is (a) to protect the jacket against thermal shock in the event of rapid changes of the temperature of coolant inside the jackeet, (b) to limit the temperature gradient across the jacket walls and hence the thermal stress, and (c) to limit the heat flow to the reservoir coolant and hence the degradation of the coolant temperature at the heat exchanger inlets.

Extensions 20 and 21 of the lining encase the heat exchangers as shown in FIGURE 2. The lining section of FIGURE 2 corresponds to a tray sector, such as that for tray 14, while the section of FIGURE 3 corresponds to a sector, such as 22 or 23 in FIGURE 1, intervening between the tray sectors and in the case of 23 actually spanning the gap between the one tray sector and the next. Connections between the sections extend between inwardly directed wings i.e. 24 and 25 in FIGURE 2 and 26 and 27 in FIGURE 3. In order that the nature of these connections may be better understood, reference will be made to FIGURE 4 which can be assumed to show the connection of wings 25 and 26 as at point 28 in FIGURE 1. However, before describing FIGURE 4, the nature of the insulation will be explained with reference to FIGURES 5, 6 and 7.

To form a panel as seen in FIGURE 5, two co-extensive stainless steel plates 30 and 31, of which both are flat apart from ribs pressed into 30 at the edges and along intersecting lines, are welded together by resistance seam welding along the lines of mutual contact, i.e. the intersecting and edge ribs, to form between the sheets a multiplicity (eight in FIGURE 5) of gas-containing compartments or pockets which are sealed from one another. By equal spacing of the intersecting ribs in FIGURE 5 the panel is given a quilted appearance. To avoid stress concentrations in the ribbed sheet the bends at the ribs should be to a radius of not less than twice the thickness of the sheet. As is apparent from the weld zone 32 in FIGURE 6 and the weld zone 33 in FIGURE 7, it is preferred that the width of seam weld is less than the rib width. In each of the pockets there in included a substantially co-extensive stiff crinkled metal foil 34, preferably in the form of dimpled stainless steel foil. Since the gas, preferably an inert gas such as argon, contained in the pockets is at sub-atmospheric pressure, e.g. 5 p.s.i.a., under external conditions of normal temperature and pressure, the foil serves as a stiffening against collapse of the thin walls of the pockets.

Specimen dimensions, given merely by way of illustration, are as follows: Panel size 6 x 3 ft., pocket size 1.5 ft. square, thickness of sheets 0.022 inch, thickness of foil 0.007 inch, seam weld width $\frac{3}{16}$ inch, internal depth of pockets 0.050 inch. The maximum thickness of the panel according to these dimensions is therefore close on one tenth of an inch. It is assumed for the purposes of the present example that the panels are built up into larger layers by butt welding of the edges of adjacent panels.

As is apparent in FIGURE 4 the lining is composed basically of four layers of the insulation as indicated at 35, 36, 37 and 38, the spacing between these layers being greater than the layer thickness. In all cases, the pocket-dividing welds in adjacent layers are staggered. There is also added over most of the structure a single thickness facing sheet or protective skin 39 having an even larger spacing from the adjacent layer, this skin being also of stainless steel. To establish connection between the wings 25, 26, corresponding layers are joined to opposite sides of connecting panels 41, 42, 43 and 44 which are pre-formed to the appropriate width with angle strip such as 45 welded to the side edge over the whole length of the panel. Rivets such as 46 are used to fix the wing layers to the flanges formed by the angle strips on the respective connecting panels. Bolts as at 47 hold together overlapping portions of the protective skin 39. The adjacent wall of the reactor jacket appears at 48.

It will be appreciated that the inturned wings 25, 26 in conjunction with the connecting panels introduce a double bend, step, or joggle into the lining which is repeated wherever the main lining sections are connected together. As explained already, this feature allows differential thermal expansion movements, as well as fitting tolerances, to be accommodated.

In order that the lower ends of the lining sections of FIGURES 2 and 3 may be fitted closely around a base assembly at a level beneath the reactor core, the wings 24–27 terminate slightly short of the lower ends of the sections and the tongues 49, 50, 51 and 52 which remain conform to the curvature of the main portion of the respective section. When the sections are connected, the insulation layers of the tongues interleave as indicated at 53 in FIGURE 4.

A further addition apparent in FIGURE 4 is an extra insulation layer 54 intervening between the layers 41 and 42 in the region of the connection between sections. This extra layer uses quilted panels in the same way as the other layers and has at its lower end an angle strip 55 through which it stands freely on the base assembly surrounded by the lining. An important function served by the arangement of the extra layer in this way is that of blocking clearance at the overhang of the wings 24–27 on the base assembly and so reducing flow up the channel formed by the double joggle of the connection between sections. More generally, the extra layer demonstrates the ease with which the amount of insulation may be augmented where required.

As support means for the insulation lining, use is made of studs mounted on the reactor jacket. It is a feature common to the various stud arrangements illustrated in FIGURES 8 to 11 that the holes in the insulation layers through which the studs can pass are formed in the same way. For forming these holes, it is arranged that the hole falls within the area of one of the pockets of a panel and the outer margin of an apertured panel insert is interposed between the sheets of the panel at a cut out in the pocket. The panel insert has an inner margin bounding the aperture and thicker than the outer margin, the edges of the sheets at the cut out being fitted up to the steps created by the change of thickness. By welding of the sheets to the outer margin the fully sealed character of the pocket is retained.

The actual bearing of weight by the stud is at one level only in the case of each lining section. In respect of the section of FIGURE 2 this level is close to the tray floor 17. Three studs are placed at this level, the holes for these being denoted 56, 57 and 58 in FIGURE 2. Although all three of these studs bear load, the central one at position 57 is the only one which fixes the lining section in all directions and therefore constitutes an anchor point. At positions 56 and 58 the holes are elongated circumferentially to allow circumferential expansion and contraction and to accommodate manufacturing tolerances.

In the anchor stud arrangement of FIGURES 8A and B, it should be noted first of all that the inner margins 59 of the panel inserts are so much thicker than the outer margins 60 interposed between the panel sheets that their faces stand proud of the sheet surfaces. The inner margins have annular distance pieces 61 interleaved between them and by virtue of the thickness of these inner margins the distance pieces do not contact the panel sheets. The aperture in both the panel inserts and the distance pieces is circular and an easy but close fit on a hollow cylindrical body 62 of the anchor stud. A backing disc 63 loose on the stud ensures proper spacing of the lining from the reactor jacket 48. The panel inserts are clamped against this backing disc by a stud nut 64 acting through a washer 65 and a tubular distance piece 66 carried by the facing sheet 39. A peg 67 of the stud for fitting into a bore in the reactor jacket is eccentrically disposed to enable small positional adjustments to be made for taking up manufacturing tolerances. When properly positioned, as by means of a template, the peg is welded to the jacket. The stud body 62 is hollow to reduce thermal conduction which would otherwise be significant in an item of this size. Preferably the hollow contains an inert gas, such as argon; the need for sub-atmospheric pressure does not apply as it does in the case of the panel pockets and therefore the inert gas is conveniently introduced at around atmospheric pressure.

For the load bearing stud arrangement of FIGURES 9A and 9B as used at positions 56 and 58, the inner margins 68 of the panel inserts have a larger diameter consistent with the elongated hole, assumed in FIGURE 9B to be 56. Also there is interposed between these margins and the hollow body 62 of the stud a bush 69 with a square outline fitting the width of the elongated aperture. This bush acts additionally as a distance piece in that its length extending between the backing disc 63 and the washer 65 limits tightening of the stud nut 65 and prevents an application of pressure to the inner margins of the panel inserts through the tubular distance piece 66; the latter therefore acts simply as a stop restraining splay of the panel inserts. Instead of an elongated aperture the distance pieces 61 interleaved between the panel inserts retain a circular aperture as indicated at 70 in FIGURE 9B.

Since the anchor and load bearing studs are close to the corner formed with the tray floor, extra insulation layers, which are added in the region of this corner in a manner similar to the layer 54 in FIGURE 4, are apparent in FIGURES 8A and 9A. In fact there are four extra layers so that the number of layers is doubled. The extra layers extend a short way to either side of the corner.

Figure 10B:
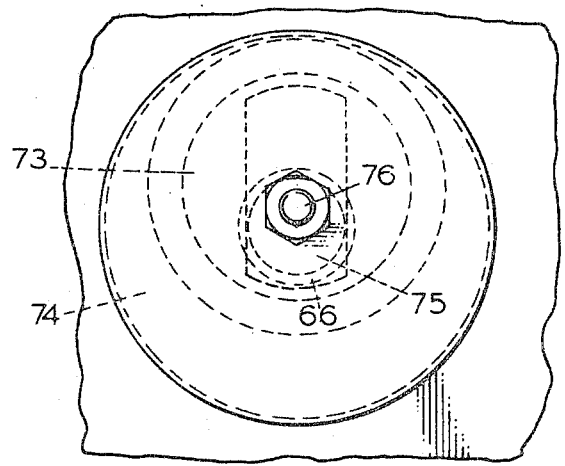

In order to hold the lining up to the walls of the reactor jacket, the location stud arrangement of FIGURES 10A and 10B is employed at positions down the vertical centre line of the lining section such as 71 and 72 (FIGURE 2). At these positions, there are no extra insulation layers and therefore thicker inner margins 73 are used on the panel inserts together with thicker annular distance pieces 74. The aperture defined by the inner margins 73 is elongated in the vertical direction, as is also the corresponding aperture in the protective skin 39, and provision is made for accommodating misalignment in the circumferential direction by fitting in the aperture an eccentrically bored bush 75. The stud 76 passing through the bore of the bush is of conventional form, i.e. solid and fixed as by welding to the reactor jacket 48. As with the load bearing stud arrangement, the bush 75 prevents an application of pressure to the inner margins of the panel inserts. The tubular distance piece 66 is loose from the protective skin 39 in this case and is separated therefrom by a washer 77.

Figure 11B:
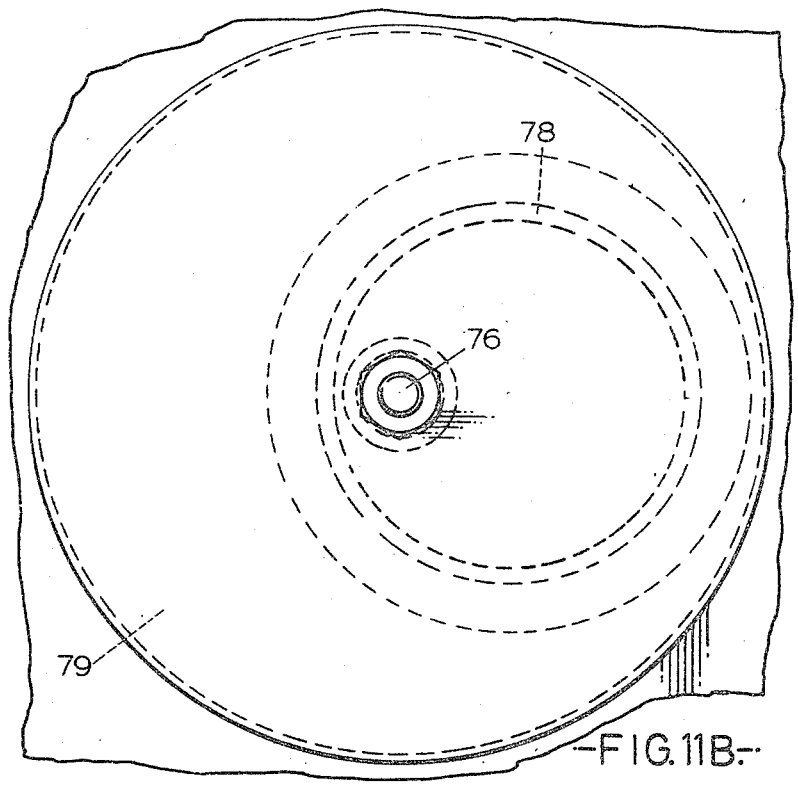

The remaining holes apparent in the lining section of FIGURE 2 are for an anti-vibration stud arrangement as shown in FIGURES 11A and 11B. This arrangement is similar to that of the previous two figures with the exception that the inner margins 78 of the panel inserts define a large circular aperture and the annular distance pieces 79 are large enough to cover the aperture regardless of how far off centre it may lie relative to the stud 76. In FIGURE 11B the aperture appears in an off-centre position. The anti-vibration stud arrangements therefore serve simply to preserve the disposition of the lining perpendicular to the wall of the reactor jacket 48. Since location in other directions is not provided by the anti-vibration stud arrangement the bush 80 is not eccentric.

Although every point of construction relevant to the fabrication of the lining of FIGURE 1 has not been described in full detail herein, the description has nevertheless covered suitable basic techniques for such requirements as the making of corners and the attachment of the lining, and an understanding of these techniques will enable their application, with or without adaptation, to the fabrication of complete insulation structures utilising layers of quilted insulation in accordance with the invention. Where there is a requirement for a load support to pass through the insulation structure, as in the case of a bracket or pedestal by which a load is carried inside the lined space, the support may be hollow and contain gas in the same way as the anchor and load bearing studs already described, in order to improve insulation integrity.

We claim:

1. Thermal insulation structure for direct contact with liquids and composed of several layers of that kind of insulation which comprises a pair of substantially parallel metal sheets joined directly to each other by welds which are continuous along lines describing a multiplicity of closed shapes within the outline of the sheets so as to define between the sheets a multiplicity of gas-filled compartments each individually fully sealed from one another, wherein said structure includes spacing means for spacing said layers apart in a manner which avoids any substantial direct contact between adjacent layers but which allows infiltration between the layers of liquid to which the structure is exposed, and means for staggering the compartment-defining welds of a layer relative to an adjacent layer.

2. Thermal insulation structure according to claim 1, wherein said spacing means comprise projections on said layers for interengagement of the layers thereat.

3. Thermal insulation structure according to claim 1, wherein said spacing means comprise distance pieces unattached to and interleaved between said layers and retained in position by support means for the whole structure.

4. Thermal insulation structure according to claim 3, including hardened faces of said metal sheets at areas of contact of said distance pieces.

5. Thermal insulation structure according to claim 1, wherein edges on the insulation layers are formed by inserts only partially interposed between the two sheets of a layer and secured thereto so as to leave a margin of the inserts uncovered.

6. Thermal insulation structure according to claim 5, wherein the insert margins are of greater thickness than that of the interposed portions of the inserts, and with or without disposition of spacing distance pieces in register with said margins of greater thickness.

7. Thermal insulation structure according to claim 1, wherein edge-joining of adjacent panels, each panel formed by a pair of joined sheets as specified in claim 1, to form each layer is accomplished by inserts each having a part interposed between and secured to the sheets of one panel and another part interposed between and secured to the sheets of the adjacent panel.

8. Thermal insulation structure according to claim 7, wherein the edges of the sheets of the adjacent panels abut, and the line of abutment of the sheets of adjacent panels on one side of said insert is staggered relative to the line of abutment of the sheets of the same panels on the other side of said insert.

9. Thermal insulation structure according to claim 1, wherein edge-joining of adjacent panels, such panel formed by a pair of joined sheets as specified in claim 1, to form each layer is accomplished by a common backing strip to which the edges of the adjacent panels are secured by welding.

10. Thermal insulation structure according to claim 1, wherein edge-joining of adjacent panels, each panel formed by a pair of joined sheets as specified in claim 1, to form each layer is accomplished by the construction that the edge of one sheet of a panel projects beyond the edge of the other sheet of that panel, the edge of that sheet of the adjacent panel which is opposed to the projecting sheet of the first panel projects beyond the other sheet of the adjacent panel, and welding the projecting parts together in overlap.

11. Thermal insulation structure according to claim 1, wherein metal strips are disposed in spaced relationship between adjacent layers for suppression of circulation of liquid between layers.

12. Thermal insulation structure according to claim 1, including a double bend for accommodating thermal expansion and extending transversely of a direction in which thermal expansion is anticipated.

13. Thermal insulation structure according to claim 1, wherein the structure has a facing in the form of a single thickness metal sheet spaced from the adjacent layer by a spacing larger than that which exists between layers.

14. In a sodium-cooled fast nuclear reactor having a jacket by which the core of the reactor is separated from a reservoir of the coolant in which the jacket and core are submerged, thermal insulation structure lining the interior of said jacket and according to claim 1.

15. For a sodium-cooled fast nuclear reactor having a jacket by which the core of the reactor is separated from a reservoir of sodium in which the jacket and core are submerged, thermal insulation structure for lining the interior of said jacket and for direct contact with the sodium, said structure comprising several layers of edge-connected panels, each panel comprising a pair of substantially parallel metal sheets, continuous welds directly joining said sheets along lines describing a multiplicity of closed shapes within the outlines of said sheets for defining between said sheets a multiplicity of gas-filled compartments each individually fully sealed from one another, spacing means for spacing said layers apart in a manner which avoids any substantial direct contact between adjacent layers but for allowing infiltration of sodium between the layers, means for staggering the compartment-defining welds of a layer relative to an adjacent layer, and a facing in the form of a single thickness metal sheet spaced from the adjacent layer by a spacing larger than that which exists between layers.

References Cited

UNITED STATES PATENTS 3,403,807 10/1968 Hawgood et al.
3,421,977 1/1969 Hutchinson et al.

REUBEN EPSTEIN, Primary Examiner

U.S. Cl. X.R.

52—615; 165—135; 176—87